United States Patent [19]

Riker

[11] Patent Number: 4,616,786

[45] Date of Patent: Oct. 14, 1986

[54] PLANT FOR PROCESSING SURPLUS CONCRETE

[75] Inventor: Rudolf Riker, Memmingen, Fed. Rep. of Germany

[73] Assignee: Stetter GmbH, Memminger, Fed. Rep. of Germany

[21] Appl. No.: 639,698

[22] Filed: Aug. 13, 1984

[51] Int. Cl.$^4$ .............................................. B02C 25/00
[52] U.S. Cl. ...................................... 241/35; 209/910; 209/913; 241/284
[58] Field of Search .................. 241/260.1, 34, 35, 36, 241/60, 79, 299, 284, 26; 209/3, 910, 913, 923, 247, 237, 284; 366/38, 64, 65, 66, 67, 151, 153, 156, 157; 134/65, 132, 133, 134

[56] References Cited

U.S. PATENT DOCUMENTS

| 903,426 | 11/1908 | Wolter et al. | 366/38 |
| 2,005,561 | 6/1935 | Roscoe et al. | 241/35 |
| 4,174,072 | 11/1979 | Kline | 241/35 |
| 4,448,678 | 5/1984 | Gentry | 241/260.1 X |

FOREIGN PATENT DOCUMENTS 2,813,056 10/1978 Fed. Rep. of Germany .......... 209/3
3034451 5/1982 Fed. Rep. of Germany .
2,098,497 11/1982 United Kingdom .................. 366/64

OTHER PUBLICATIONS

Concrete Recycling Plant, Schwing America Inc.

Primary Examiner—Mark Rosenbaum
Attorney, Agent, or Firm—Kuhn Muller and Bazerman

[57] ABSTRACT

Surplus concrete or return concrete to be processed is poured into a high-capacity receiving bin and is transferred at a metered rate from said bin by means of a screw conveyor to a washing apparatus, in which fine components are separated from very fine components. The transfer at the metered rate is effected in dependence on the driving power of rotary motors of the rotary washing apparatus. When the driving power of the motors exceeds a predetermined value, then the motor of the screw conveyor is deenergized. When the driving power decreases below that value or below another value, the supply at the metered rate is resumed. The plant operates fully automatically and when the receiving bin has been emptied the plant is automatically cleaned and automatically shut down.

13 Claims, 10 Drawing Figures

PLANT FOR PROCESSING SURPLUS CONCRETE

BACKGROUND OF THE INVENTION

This invention relates to a plant for processing surplus concrete comprising a receiving bin having mutually opposite end walls, two side walls, a bottom and a top covering grate, also comprising a washing apparatus for separating the surplus concrete into a plurality of components, such as sand and gravel, on the one hand, and very fine components, on the other hand, which latter are entrained by rinsing water discharged at one end of the washing apparatus whereas the first component is discharged at the opposite end of the washing apparatus, also comprising an inclined transfer duct, which adjoins the inclined bottom of the receiving bin and connects the receiving bin to the washing apparatus, and discharge control apparatus for controlling the discharge of surplus concrete from the receiving bin in dependence on the free processing capacity of the washing apparatus.

Such plant is known from German Pat. No. 30 34 451. The discharge control apparatus consists of a flap, which is suspended like a pendulum and by means of a positioning motor is to be actuated in dependence on the driving power of the washing apparatus in such a manner that the flap is closed in response to an increase of the driving power of the washing apparatus and is reopened in response to a subsequent decrease of the driving power. The receiving bin has a cubic capacity of about 1 cubic meter. A vehicle from which 5 cubic meters of surplus concrete are to be discharged can be discharged only in a plurality of batches corresponding to the capacity of the washing apparatus, which may be able to process, e.g., 5 cubic meters per hour. In that case the vehicle will have to wait for one hour. The control of the discharge flap in dependence on the power requirement of the washing apparatus as taught by German Pat. No. 30 34 451 is not optimum. If the receiving bin is full and the flap is opened, a large quantity of surplus concrete will be instantaneously delivered to the washing apparatus. But the power input of the rotary drive of the washing drum will not considerably increase until the fine and coarse components are lifted by the scooping buckets and only thereafter can the flap be closed. The quantity of surplus concrete which has entered the washing drum before that time is larger than would be permissible for an optimum cut of about 0.2 mm.

BRIEF SUMMARY OF THE INVENTION

Objects of the invention are so to improve the known plant that larger quantities of surplus concrete and return concrete, of an order of 5 cubic meters, can be charged into the receiving bin within a short time, that the concrete charge is automatically processed under a more accurate automatic control in such a manner that the washing apparatus will not be overloaded, and that a smaller cut can be ensured.

This object is accomplished in accordance with the invention in that the receiving bin consists of an elongate trough, the length of which is at least twice its width and which has a bottom in the shape of a segment of a cylindrical surface, the trough contains a conveyor screw, which at least in part constitutes the discharge control apparatus and which is rotatably mounted in the end walls of the receiving bin and outside the receiving bin is operatively connected to a drive motor, the axis of rotation of the conveyor screw coincides at least approximately with the geometrical axis of the bottom having the shape of a segment of a cylindrical surface, and the speed of the drive motor for the conveyor screw is adapted to be controlled in dependence on the instantaneous current consumption of a drive motor for an implement which succeeds the conveyor.

In the production and processing of concrete it is known to use screw conveyors as so-called dewatering screws but these cannot take up a relatively large quantity of concrete within a short time.

The essential advantage afforded by the invention resides in that the speed of the conveyor screw can be controlled in adaptation to the free processing capacity of the washing apparatus so that surplus concrete will be supplied to the washing apparatus approximately at the rate which can be processed in said apparatus, regardless of the level to which the receiving bin is filled. The selected rate of discharge from the receiving bin is preferably slightly higher. If the current consumption of the drive for the washing drum then exceeds an adjusted value, the speed of the conveyor screw will be automatically decreased so that the current consumption of the washing drum will subsequently decrease below said value or another, slightly different adjusted value. Thereafter the speed of the conveyor screw is increased to increase the discharge rate. This automatic control is highly accurate. An overcharging of the washing drum is precluded and the latter will operate under optimum conditions so that a very small cut is maintained.

The use of conveyor screw according to the invention permits the use of a receiving bin having a very large length, which may be three times its width or larger. Preferably the length is about 5 meters and the width about 1.5 meters so that a cubic capacity of about 6 cubic meters can be obtained. As the buffer bin is large, a smaller washing drum may be used because the resulting increase of the running time has no detrimental result since the plant is fully automated and is automatically shut off.

In a particularly simple embodiment of the invention the automatic control is effected in that the drive motor for the conveyor screw is deenergized in response to a rise of the electric current in the circuit of the drive motor for the succeeding implement and is reenergized in response to a drop of said current below a preselected value. In an alternative mode of automatic control, the speed of the drive motor for the conveyor screw is adapted to be infinitely controlled and its speed is automatically controlled in dependence on the current consumption of the drive motor for the succeeding implement in such a manner that the speed of the drive motor for the conveyor screw is increased in response to a decrease of the current consumption of the drive motor for the succeeding implement and vice versa.

The succeeding implement consists preferably of the washing apparatus but in another embodiment of the invention may consist of an elevator which succeeds the washing apparatus.

Whereas the conveyor screw may be the only metering apparatus, in a desirable embodiment the shutoff flap, known per se, is additionally used. In a simple arrangement that shutoff flap consists entirely of elastically deformable material so that it will close automatically when the conveyor screw is at rest and that it will open when the conveyor screw is in operation. Alternatively, a feature of the invention resides in that the actuator for the shutoff valve is operated at the time at which the speed of the conveyor screw is changed.

The receiving bin is provided below its covering grate with a rinsing water cleansing apparatus known per se. In accordance with the invention that cleansing apparatus is also activated when the current consumption of the drive motor for the succeeding implement decreases below an adjusted value. The rinsing water cleansing apparatus operates preferably in intervals and is deenergized by a timer or when the driving power of the washing drum corresponds to a no-load value.

In accordance with a further feature the transfer duct is provided with a separate rinsing water cleansing apparatus, which is automatically controlled like the cleansing apparatus of the receiving bin.

In accordance with a further important feature the water supply system provided in the washing apparatus is automatically controlled in dependence on the activation of the rinsing water cleansing apparatus in the receiving bin in such a manner that the supply of water from the water supply system of the washing apparatus is throttled or entirely shut down when the receiving bin is being rinsed.

In accordance with German Pat. No. 30 34 451, relatively large receiving bins cannot be mounted by means of rubber-metal connectors and provided with a vibratory drive. In accordance with a feature of the invention the transfer duct is connected to the receiving bin by means of a flexible duct section so that the transfer duct can be operated as a vibratory duct conveyor and a reliable emptying will be ensured even if the duct is only slightly inclined.

The invention will now be explained more fully with reference to the drawing.

DESCRIPTION OF THE PREFERRED EMBODIMENTS

Figures 1, 2:
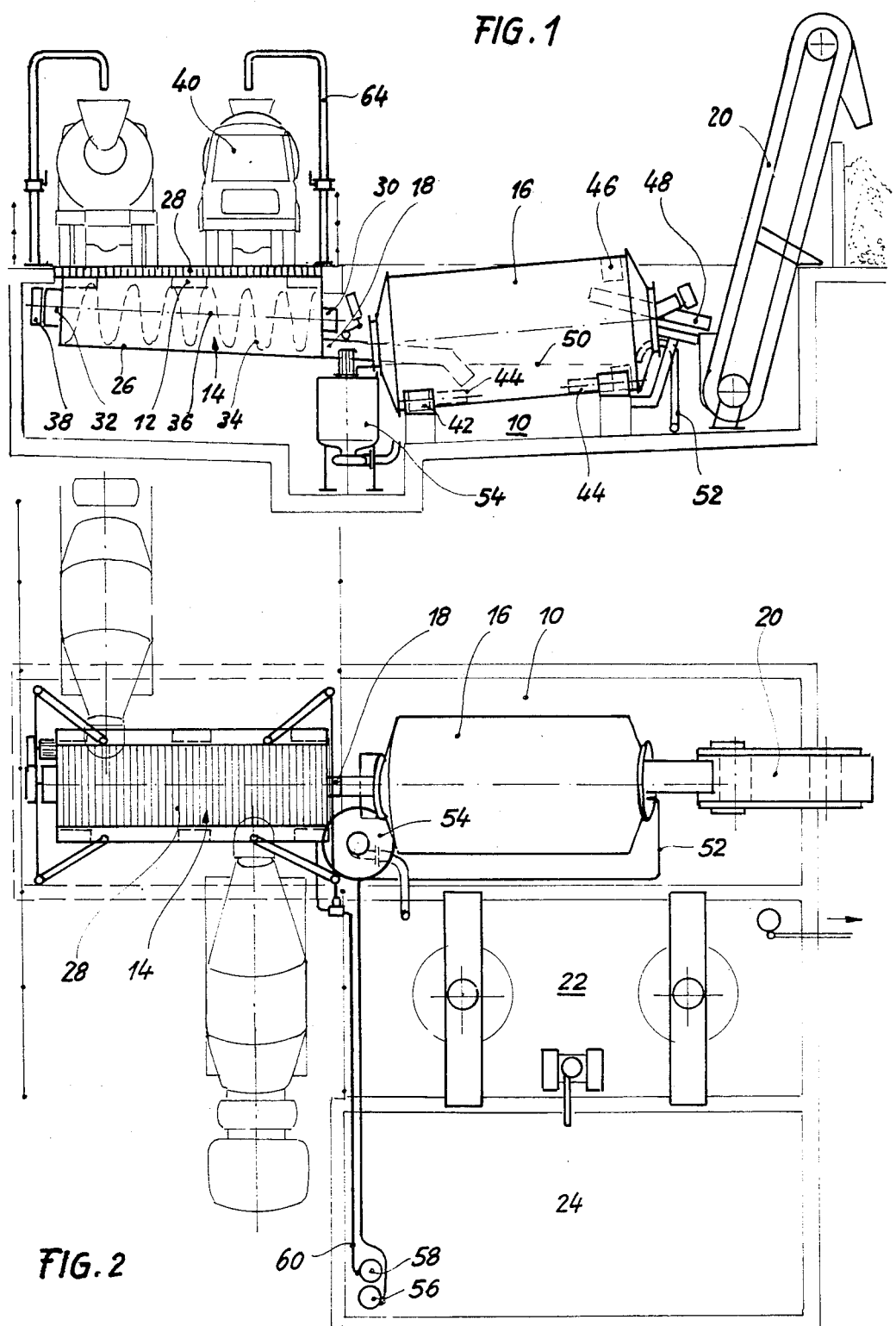
FIG. 1 is a diagrammatic side elevation showing a plant for processing surplus concrete.
FIG. 2 is a top plan view showing the plant of FIG. 1.

A pit 10 contains a receiving bin 14, which is supported along upper longitudinal frames 12, a washing apparatus 16 consisting of a cylindrical drum, a transfer duct 18 connecting the receiving bin to the washing apparatus 16, an elevator 20, which succeeds the washing apparatus 16, a sludge water tank 22 and a pure water tank 24. The receiving bin 14 consists of vertical end walls, vertical or slightly upwardly and outwardly inclined side walls, a bottom 26 having the shape of a segment of a cylindrical surface, and a horizontal covering grate 28, which is trafficable by trucks. The end walls of the receiving bin are provided on the outside with bearings 30, 32, in which a shaft carrying a conveyor screw 34 is rotatably mounted. The axis 36 of the conveyor screw coincides with the geometrical axis of the bottom 26, which has the shape of a segment of a cylindrical surface. A drive motor 38 drives the conveyor screw 34. The axis 36 and the bottom 26 having the shape of a segment of a cylindrical surface are downwardly inclined in the discharge direction. The bottom 26 having the shape of a segment of a cylindrical surface is adjoined at its lowermost point, near the end wall at the discharge end of the receiving bin 14, by the transfer duct 18, which is also inclined and through an annular inlet mouthpiece of the washing apparatus extends into the interior of said apparatus.

Figure 3:
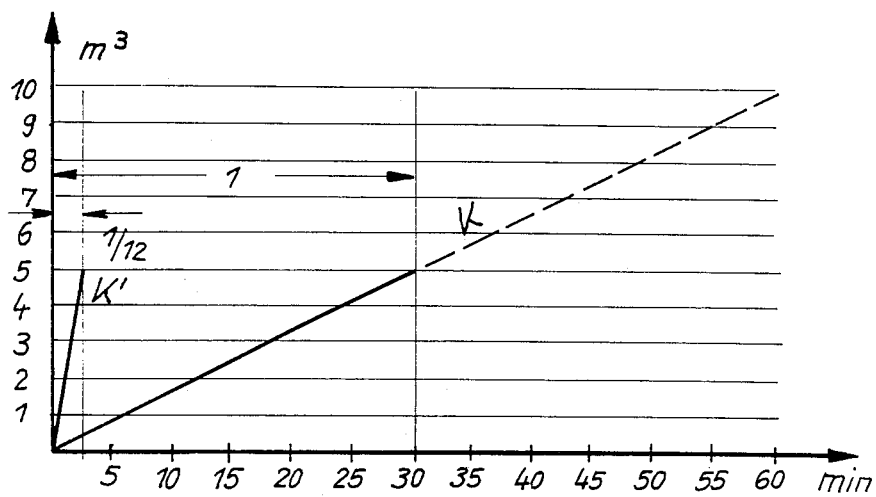
FIG. 3 is a power graph showing the operating characteristics of the receiving bin and the washing apparatus.

Surplus concrete or return concrete can be unloaded from four motor trucks 40 into the receiving bin 14 at the same time. As is illustrated in FIG. 3, 5 cubic meters can be unloaded within 2½ minutes. The conveyor screw 34 delivers at a certain rate, which slightly exceeds the processing capacity of the washing apparatus 16. In the present embodiment the washing apparatus 16 has a processing capacity of 10 cubic meters per hour. The delivery rate of the conveyor screw 34 is about 10% higher. If the preceding receiving bin were not provided, the motor trucks 40 would have to remain at the unloading point for 30 minutes. Only 1/12 of that time is now required owing to the receiving bin. In FIG. 3, the processing rate characteristic of the washing apparatus 16 is designated K and the receiving rate characteristic of the receiving bin 14 is designated K'.

The washing apparatus 16 contains a built-in conveyor screw for conveying sand and gravel toward the right-hand end during the rotation of the drum-shaped washing apparatus. For this purpose the washing apparatus is supported by four supporting rollers 42. Those of said supporting rollers which are disposed on each side are driven by a drive motor 44 (FIGS. 7 to 10). The drum-shaped washing apparatus 16 contains at its right-hand end a plurality of scooping buckets 46 for conveying the coarse and fine components to a vibratory chute 48, by which the discharged solids are transferred to the elevator 20. The washing apparatus 16 contains a body of rinsing water, the level of which is designated 50. Rinsing water is continuously supplied through line 52. That rinsing water contains very fine components in suspension and leaves the washing apparatus 16 through its inlet opening and enters a sludge water conveyor 54 and is delivered by the latter to the sludge water tank 22 and from the latter over an overflow to the rinsing water tank 24. From the latter, rinsing water is pumped back to the washing apparatus 16 by the pump 56 through line 52. Another pump 58 supplies rinsing water through a line 60 to a cleansing apparatus 62, which is installed on both longitudinal sides below the grate 28. Line 60 feeds also water-spraying davits 64, which are installed above the surface and serve to cleanse the vehicles.

Figure 4:
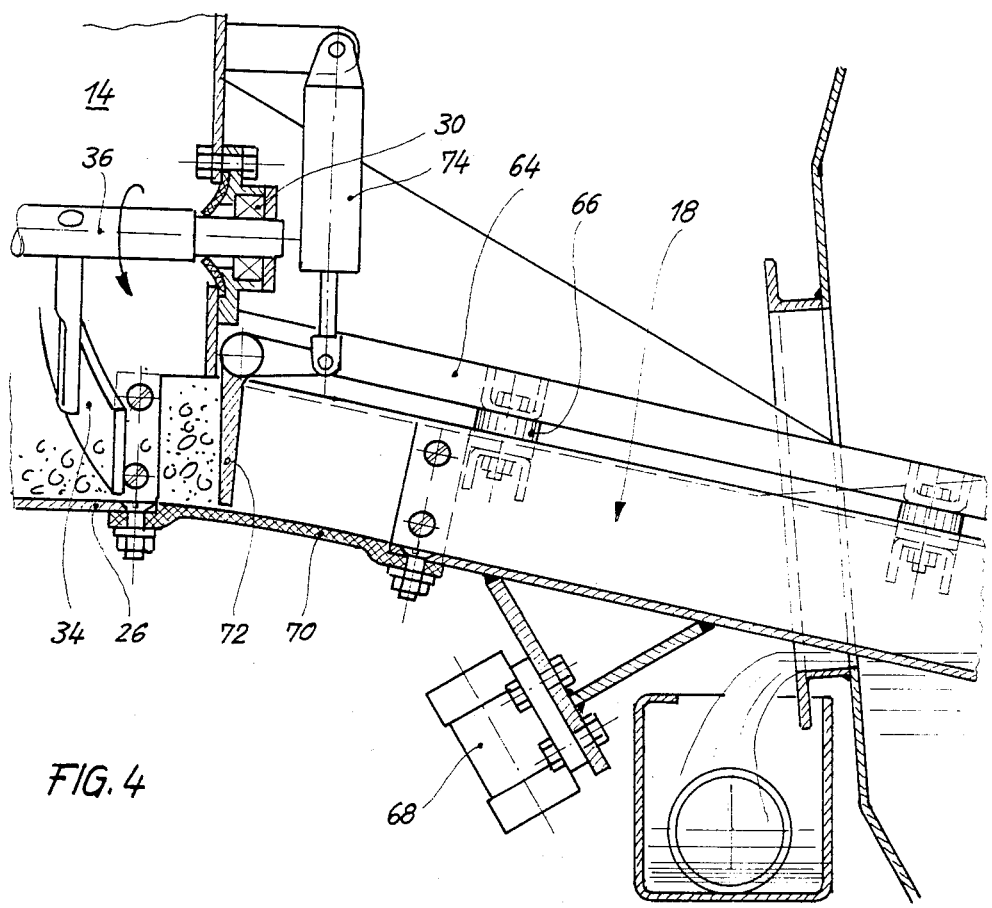
FIG. 4 is an enlarged view showing how the receiving bin provided with a shutoff valve and transfer duct is connected to the washing apparatus.

As is apparent from FIG. 4, a strut 65 is provided, which is secured to the frame and on which the transfer duct 18 is movably mounted by means of rubber-metal connectors 66. The duct is operable by means of a vibrator 68 and thus constitutes a vibratory duct conveyor. The transfer duct 18 is connected by a flexible duct section 70 to the bottom 26 and to the end wall of the receiving bin 14. A shutoff flap 72 is provided near the discharge portion of the end wall below the bearing 30 and is adapted to be opened and closed by means of an actuating cylinder 74.

Figure 5:
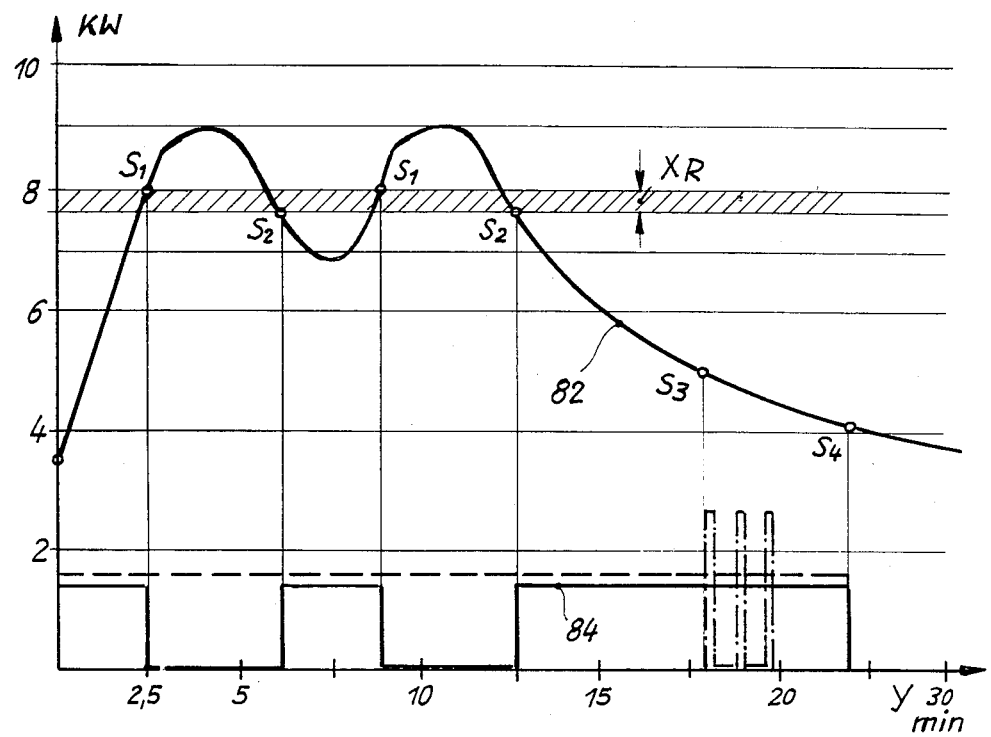
FIG. 5 is a graph illustrating the current consumption of the drive motors for the washing drum with a threshold value detector for automatically controlling the conveyor screw associated with the receiving bin and for activating the rinsing water cleansing apparatus.
Figure 7:
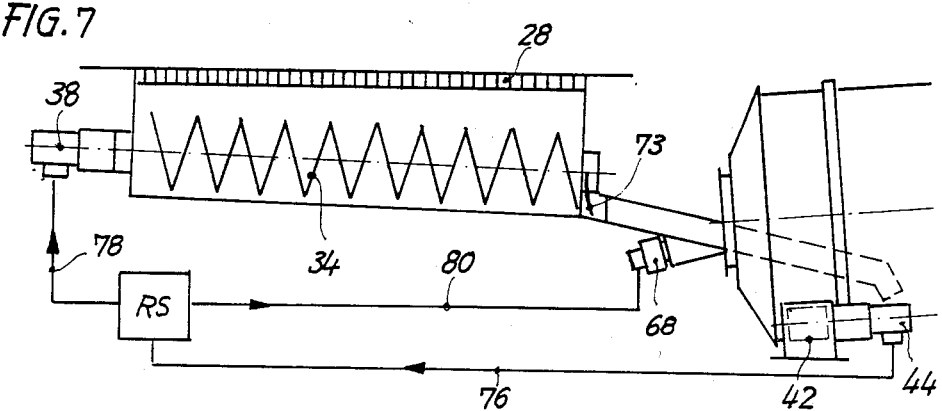
FIG. 7 is an elevation with a diagrammatic representation of the on-off control of the conveyor screw motor and of the vibrator associated with the transfer duct.
Figure 8:
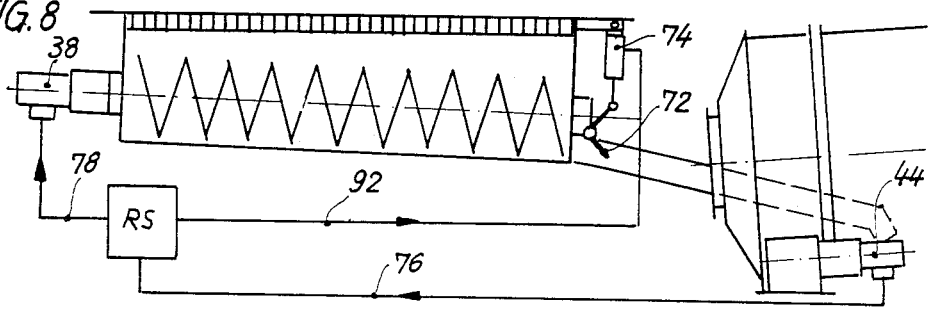
FIG. 8 is a showing that is similar to FIG. 7 with means for a simultaneous automatic control of the discharge flap.
Figure 10:
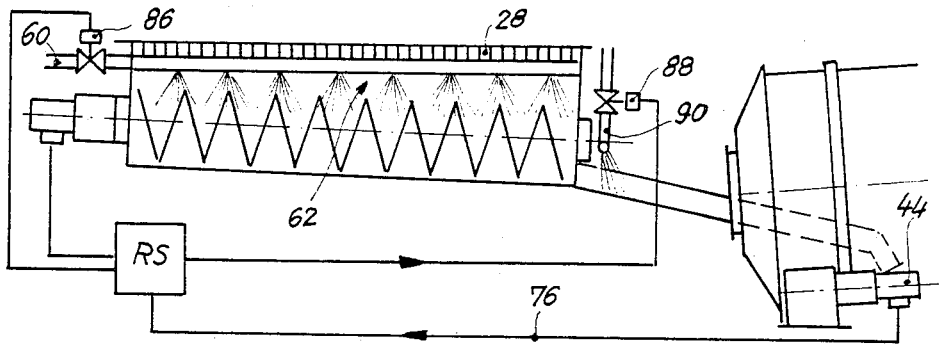
FIG. 10 is a showing that is similar to FIGS. 7 to 9 with means for activating the rinsing water system associated with the receiving bin.

The principle of the automatic control will now be described with reference to FIG. 5. The plant is started in response to the beginning of the charging of surplus concrete into the receiving bin 14. The conveyor screw 34 supplies the concrete to the washing apparatus 16, which is rotated by the motors 44. In dependence on the quantity of concrete which has been received, the driving power of said motors 44 gradually increases from the no-load power, which is less than 4 kW. The power of the motors 44 is measured by a power meter, which is incorporated in a switching device RS and connected to the motors 44 by a lead 76. A threshold value of 8 kW has been adjusted. When that value designated $S_1$ in FIG. 5 has been reached, the drive motor 38 for the conveyor screw 34 and the vibrator 68 are stopped via lines 78, 80. The driving power 44 will then slightly increase further and will subsequently decrease to a second adjusted threshold value slightly below 8 kW. At said second threshold value, designated $S_2$, the motors 38, 68 are reenergized. This switching cycle is repeated. The hysteresis $X_R$ of the feedback control system may be very small. The characteristic curve 82 in FIG. 5 represents the power input of the drive motors 44. The characteristic curve 84 represents the power input of the drive motor 38 for the conveyor screw 34. In accordance with FIG. 5 the receiving bin 14 has been emptied after 12.5 minutes. Thereafter the driving power of the motors 44 decreases further. When a power slightly above the no-load power has been reached, solenoid valves 86, 88 shown in FIG. 10 are opened for a short time to activate the spraying apparatus 62 in the receiving bin 14 and a separate spraying apparatus 90 provided adjacent to the transfer duct 18. A plurality of spraying cycles are repeated in intervals under the control of a timer. During the operation of the spraying apparatus 62, 90, the pump 56 for feeding the washing apparatus 16 remains inoperative. When the drive motors 44 are operated approximately at their no-load power, the motors 38, 68 are finally deenergized in the embodiment shown in FIG. 7 when the threshold $S_4$ has been reached so that the elastic shut-off flap shown in FIG. 7 is automatically closed. In the embodiment shown in FIG. 8, the actuator 74 is simultaneously operated via a line 92 so that the flap 72 is closed by a power actuator. After an adjustable after-running time, the controller RS deenergizes the drive motors 44 and the pumps 56, 58 so that the plant has been shut down without a need for a manual intervention.

Figure 9:
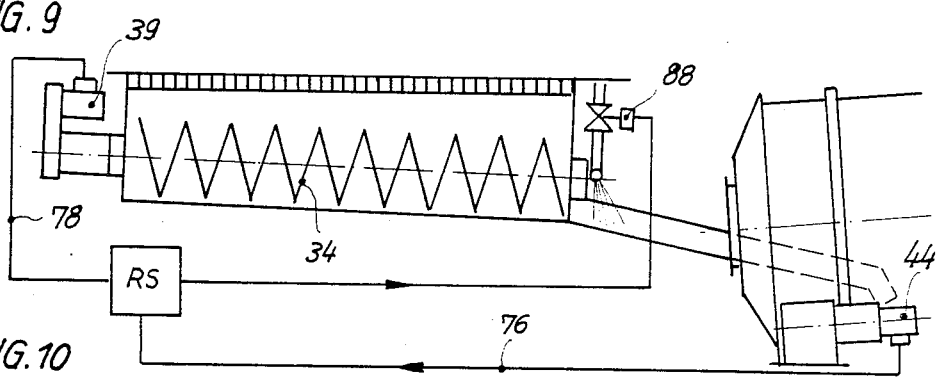
FIG. 9 is a showing that is similar to FIGS. 7 and 8 with means for an automatic control of the speed of a gearmotor for the conveyor screw and for activating the rinsing water system associated with the transfer duct.

In the embodiment shown in FIG. 9, the drive motor 38 provided with an on-off control has been replaced by a gearmotor 39 for an infinite speed control. Via the lead 78 the controller RS effects a decrease of the speed of the conveyor screw 34 when the driving power of the motor 44 has reached the threshold value $S_1$ and increased that speed when approximately the threshold value $S_2$ has been reached.

Instead of the power input of drive motors 44 for the washing apparatus 16, the power input of the drive motor for the elevator 20 may be used as a controlled variable.

The vibratory duct 48 and the elevator 20 may be replaced by a belt conveyor having an inclination of about 15°. In that case the scooping buckets 46 deliver directly onto the belt conveyor and the delivery to the washing apparatus will be automatically controlled in dependence on the driving power of that belt conveyor.

Whereas the washing apparatus shown on the drawings consists of a washing drum, that drum may be replaced within the scope of the invention by any known washing apparatus, such as a washing screw or washing pipe.

Figure 6:
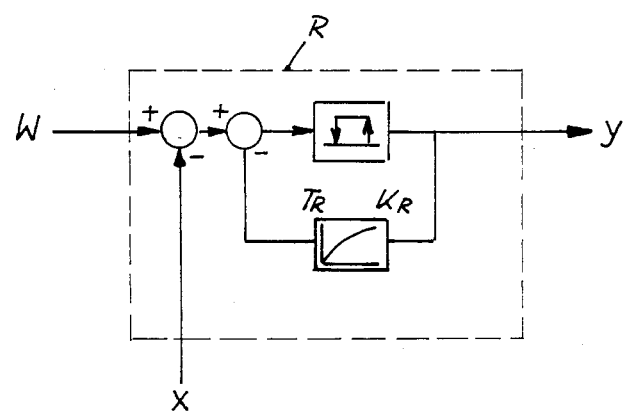
FIG. 6 is a block circuit diagram of the means for the automatic control illustrated in FIG. 5.

FIG. 6 is a block circuit diagram showing a two-position differential gap control system, wherein "W" designates the reference input, "X" designates the controlled variable and "Y" designates the manipulated variable. The internal feedback is effected by a PT1 element. The negative feedback provides a feedback control in which the transfer coefficient KR and the feedback time constant TR are adjustable. Such control may be used in combination with the speed-dependent supply illustrated in FIG. 9. Without the negative feedback, this would constitute a strict two-position control as illustrated in FIG. 7, in which only the threshold values $S_1$ and $S_2$, i.e., the hysteresis, would be adjustable.

I claim:

1. In a plant for processing surplus concrete comprising a receiving bin having mutually opposite end walls, two side walls, a bottom and a top covering grate, a cleansing apparatus adapted to supply rinsing water into the receiving bin, also comprising a washing apparatus for separating the surplus concrete into a plurality of components, such as sand and gravel, on the one hand, and very fine components, on the other hand, which latter are entrained by rinsing water discharged at one end of the washing apparatus whereas the first component is discharged at the opposite end of the washing apparatus, also comprising an inclined transfer duct, which adjoins the inclined bottom of the receiving bin and connects the receiving bin to the washing apparatus, and discharge control apparatus for controlling the discharge of surplus concrete from the receiving bin in dependence on the free processing capacity of the washing apparatus, the improvement comprising: the receiving bin consists of an elongate trough, the length of which is at least twice its width and which has a bottom in the shape of a segment of a cylindrical surface, the trough contains a conveyor screw, whereby the concrete in the trough is revolved and setting thereof prevented, which at least in part constitutes the discharge control apparatus and which conveyor screw is rotatably mounted in the end walls of the receiving bin and outside the receiving bin is operatively connected to a drive motor, the axis of rotation of the conveyor screw coincides at least approximately with the geometrical axis of the bottom having the shape of a segment of a cylindrical surface, and the speed of the drive motor for the conveyor screw is adapted to be controlled in dependence on the instantaneous current consumption of a second drive motor for an implement which succeeds the conveyor, said implement being selected from the group consisting of the washing apparatus, an elevator which succeeds the washing apparatus and a belt conveyor for discharged concrete components.

2. A plant according to claim 1, wherein the drive motor for the conveyor screw is deenergized in response to a rise of the electric current in the circuit of the drive motor for the succeeding implement and the drive motor for the conveyor screw is reenergized in response to a drop of said current below a preselected value.

3. A plant according to claim 1, characterized in that the speed of the drive motor for the conveyor screw is adapted to be continuously controlled and its speed is automatically controlled in dependence on the current consumption of the drive motor for the succeeding implement in such a manner that the speed of the drive motor for the conveyor screw is increased in response to a decrease of the current consumption of the drive motor for the succeeding implement and vice versa.

4. A plant according to claim 1, wherein the discharge control apparatus comprises a shutoff valve, which is provided with an actuator, which is operated when the speed of the conveyor screw is being changed.

5. A plant according to claim 1, wherein the succeeding implement consists of an elevator which succeeds the washing apparatus.

6. A plant according to claim 1, wherein the receiving bin is provided with a rinsing water cleansing apparatus, which is activated when the current consumption of the drive motor for the succeeding implement decreases below an adjusted value.

7. A plant according to claim 6, wherein the washing apparatus is provided with a separate water supply system and the throughput of said system is at least reduced when the rinsing water cleansing apparatus of the receiving bin is activated.

8. A plant according to claim 1, wherein a rinsing water cleansing apparatus is associated with the transfer duct and is activated when the current consumption of the drive motor for the succeeding implement decreases below an adjusted value.

9. A plant according to claim 1, wherein the transfer duct consists of a vibratory duct conveyor and is mounted so as to be capable of vibration and is connected to a vibrator and is connected to the receiving bin by a flexible duct section.

10. A plant according to claim 1, wherein a rinsing water cleansing apparatus installed in the receiving bin is activated in intervals when the receiving bin has been emptied.

11. An improvement as claimed in claim 1, wherein the transfer duct is mounted for vibration and connected to vibrator means, and a flexible duct section is inserted between the holding tank and the transfer duct.

12. An improvement as claimed in claim 1, wherein cleansing apparatus is provided comprising spray nozzles arranged above the transfer duct.

13. In an improvement in concrete recycling plants comprising a feed compartment, having side walls, end walls and a bottom, a discharge opening provided in one of said end walls, a closure flap arranged at the discharge opening, a cleansing apparatus adapted to supply rinsing water into the feed compartment, the latter connected by an inclined transfer duct to a washing drum for separating concrete into sand and gravel; on the one hand, and cement slurry water, on the other hand, the washing drum mounted for rotation and driven by a drive motor, and provided with a plurality of discharge buckets at the inside periphery thereof for lifting said sand and gravel and discharging them via a discharge chute through an endwall opening of the washing drum, a control means for regulating the discharge of concrete from the feed compartment into the washing drum in dependence on the power consumption of the drive motor, the improvement comprising a large holding tank constituting said feed compartment, said tank having a volume capacity in the order of at least 5 cubic meters and a length of at least 4 meters, allowing two mixer trucks arranged side by side to deliver concrete into the tank simultaneously, the bottom of the tank shaped cylindrically, a conveyor screw mounted for rotation in said tank, about an axis substantially coinciding with the longitudinal axis of said cylindrical bottom of the tank, means for holding the closure flap in an open position when the conveyor screw is in rotation and to hold the closure flap in closed position when the conveyor screw has been stopped, the conveyor screw operatively connected to an electrical drive motor, said control means comprising means for controlling the output of the conveyor screw in dependence on the momentary power consumption of the drive motor of the washing drum, the maximum output of the conveyor screw designed for a delivery rate of concrete slightly higher than the processing capacity of the washing drum and the control means comprising a feedback control system adapted to decrease the output of the conveyor screw when the power consumption has reached a predetermined level corresponding to the processing capacity of the washing drum and to increase the output of the conveyor screw again when the power consumption of the drive motor of the washing drum has reached a first value slightly below said predetermined level, and the control means further comprising means for detecting a second power value of the drive motor of the washing drum slightly above the no-load power level for opening solenoid valve means in a conduit of the cleansing apparatus for a period of time and to shut off the plant automatically after an adjustable afterrunning time.

* * * * *